Oct. 14, 1930.                M. E. ROE                 1,778,167
                                CASTER
                    Original Filed Oct. 10, 1924

INVENTOR
Mayo E. Roe
BY
Richey, Slough & Watts
ATTORNEYS.

Patented Oct. 14, 1930

1,778,167

UNITED STATES PATENT OFFICE

MAYO E. ROE, OF ELYRIA, OHIO, ASSIGNOR TO THE COLSON COMPANY, A CORPORATION OF OHIO

CASTER

Application filed October 10, 1924, Serial No. 742,762. Renewed March 26, 1928.

This invention relates to wheel supports, and has to do more particularly with caster constructions.

There are certain types of caster supported apparatus which at times it is desirable, or necessary to maintain in a stationary position, and it is an object of my invention to provide a caster construction which can be readily shifted to provide either a stationary or a rolling support.

Another object of my invention is to provide a swivel caster construction which can be readily adjusted to provide either a stationary or a revolving support without affecting the position of the apparatus supported thereby.

Another object of my invention is to provide a swivel caster in which the position of the wheel is shifted to provide either a stationary or a revoluble support.

These and other objects and the invention itself will appear in the following specification.

In the drawings—

Figure 1:
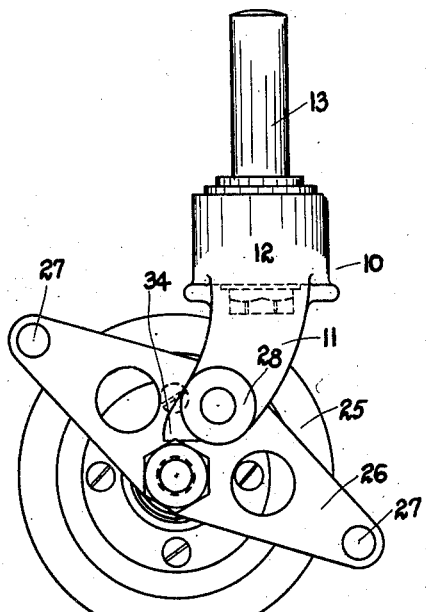
Fig. 1 is a side elevation of a caster wheel construction involving my invention and showing the wheel in position to swivel and revolve.

Referring to the drawings by characters of reference, 10 represents the fork member which consists of a pair of spaced elements 11 terminating at their upper ends in a bearing housing 12. A stem 13 extends vertically through the central aperture 14 in the fork housing, and is supported therein by bearings. An upper bearing cup 15 is pressed into the upper end of the aperture 14 and provides a race for the balls 16. A cone 17 extends over the balls 16, within the cup 15, and provides a seat for the annular shoulder 18 on the fork stem 13. A bearing cup 19 is secured in the lower end of the aperture 14 and provides a race for the balls 20. The stem 13 extends through the bearings being threaded at its lower end, and a washer 21 is mounted upon the stem and bears against a cone 22 which extends over the balls 20 within the cup 19. A castle nut 23 is screwed upon the end of the fork stem and bears against the washer 21 and is so secured by a pin 24, thereby maintaining the lower bearing assembled and securing the stem against vertical displacement from the fork housing. It will be seen that the fork is mounted so that it is free to swivel with respect to the fork stem.

The frame for carrying the wheel 25 consists of a pair of similar spaced members 26 which extend transversely to the fork elements and are secured in such relation by rivets 27 adjacent each end thereof. The carrier frame is of a width such that it can be pivotally mounted intermediate the fork elements 11. The fork elements are provided with bosses 28 adjacent their lower ends which have aligned apertures 29 therethrough, and pintle pins 30 extend through such apertures and the upper central portions of the frame sides 26. The ends of the pintle pins are enlarged to secure the frame sides with the fork elements, and the carrier frame is adapted to rotate upon such pins.

An axle 31, having threaded ends, extends axially through the wheel 25, which is preferably provided with a rubber tread, and the threaded ends thereof extend through apertures in the lower central portions of the frame sides 26. The axle 31 and the pintle pins are preferably arranged in the same vertical plane when the frame is in horizontal position. The axle 31 is rigidly secured to the carrier by nuts 32, and washers 33 which are interposed therebetween.

It will be seen that the wheel is arranged to rotate upon the axle 31 and that the axle is rigidly secured with the carrier. The carrier frame is free to rock upon the pintle pins, and the revoluble wheel will move therewith.

Figure 2:
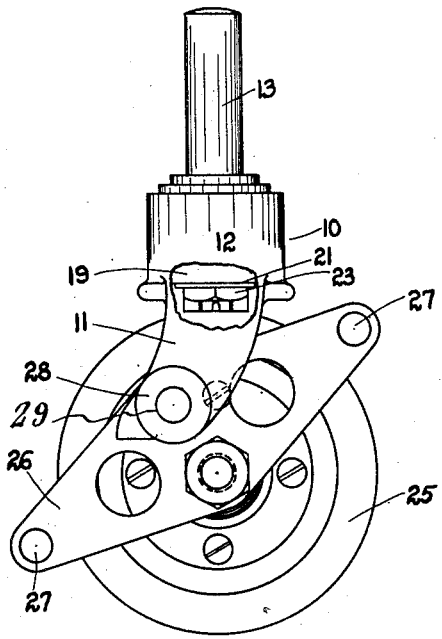
Fig. 2 is a similar view with the wheel in stationary position.
Figure 3:
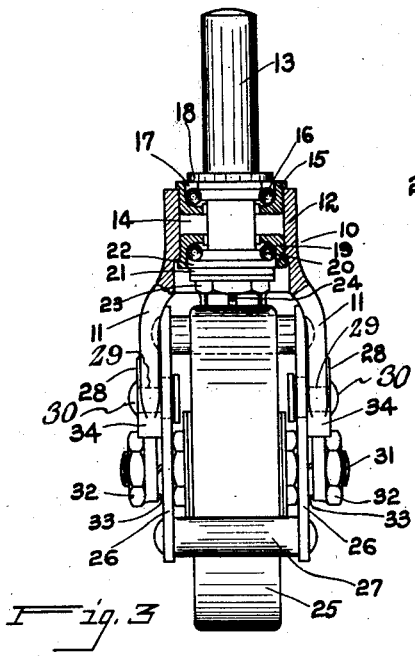
Fig. 3 is a rear elevation of the caster shown in Fig. 1, with the fork and bearings partially in section.
Figure 4:
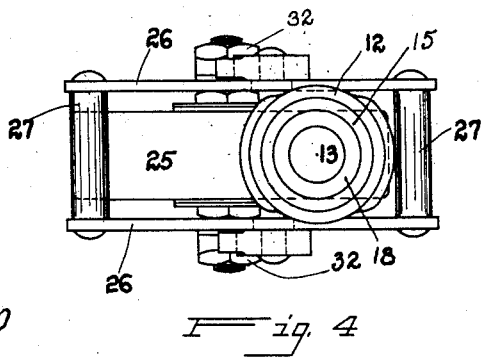
Fig. 4 is a top plan view of the caster shown in Fig. 1.

The fork elements 11 are provided at their lower ends with extensions 34 which project from the bosses 28, and the undersides thereof provide bearings which will engage the nuts 32 on the axle 31, when the carrier is swung upwardly at its forward end, as shown in Fig. 1. When in such position, the axis of the wheel being offset in a vertical plane relative to the axis of the stem, the weight imposed upon the caster stem will cause the carrier frame to remain in such position. When the position of the carrier is changed, and the rear end thereof is swung upwardly, as shown in Fig. 2, the axis of the wheel is shifted into substantially the same vertical plane as the axis of the stem, and the tread of the wheel will be wedged against the end of the castle nut 23, on the stem and the entire weight carried by the caster stem will be thus transferred to the tread of the wheel on the upper portion thereof. When in such position the fork will be maintained stationary so that it will not swivel, and the wheel will be held stationary and cannot revolve on its axle. The carrier frame can readily be shifted into either of the positions described, by pressing down upon one or the other of the ends thereof.

It will thus be seen that by shifting the position of the carrier, the caster wheel will either be in a position to swivel and revolve, or will be locked stationary so that it will not revolve or swivel. It will also be seen that the frame can be pivotally adjusted without changing the position of the apparatus supported thereby.

Various changes can be made in the details of construction described herein without departing from the spirit of my invention and the scope of the claims.

What I claim is:—

1. In a caster construction, a fork member comprising a housing having spaced fork elements depending therefrom, a stem extending through said housing, ball bearings intermediate said stem and housing, a nut screwed upon the end of said stem to maintain the fork member therewith, a frame pivoted to said forks in a plane removed from the axis of said stem, a revoluble wheel carried by said frame, the ends of said forks limiting the pivotal movement of said frame in one direction, said wheel wedging against said nut when said frame is shifted in the other direction.

2. In a caster, the combination with a caster wheel, a bifurcated caster yoke adapted to be secured to an article to be supported by the wheel, an axle for the wheel, a lever element having a pair of joined lever arms disposed at either side of the wheel, each of the arms being secured on a different end of the axle, each of the yoke forks being pivotally secured eccentrically of the axle to a different one of the said arms, said lever adapted to be rocked to two different operative positions, and stop means to limit the rocking movement of the lever in one direction, said yoke element adapted to contact with a non-axial portion of the wheel to lock it against rotation when the lever is moved to its opposite operative position.

3. In a caster, the combination with a caster wheel, a bifurcated caster yoke adapted to be secured to an article to be supported by the wheel, an axle for the wheel, a lever element having a pair of joined lever arms disposed at either side of the wheel, each of the arms being secured on a different end of the axle, each of the yoke forks being pivotally secured eccentrically of the axle to a different one of the said arms, said lever adapted to be rocked to two different operative positions, and stop means to limit the rocking movement of the lever in one direction, said yoke element adapted to contact with a non-axial portion of the wheel to lock it against rotation when the lever is moved to its opposite operative position, the point of pivoting of the yoke forks to the lever arms being in both operative and all intermediate positions disposed above a horizontal plane relative to the axis of the wheel, the pivot being disposed laterally of a vertical plane relative to said wheel axle, when the lever is in its first said stopped operative position.

4. In a caster, the combination with a caster wheel, a bifurcated caster yoke adapted to be secured to an article to be supported by the wheel, an axle for the wheel, a lever element having a pair of joined lever arms disposed at either side of the wheel, each of the arms being secured on a different end of the axle, each of the yoke forks being pivotally secured eccentrically of the axle to a different one of the said arms, said lever adapted to be rocked to two different operative positions, and stop means to limit the rocking movement of the lever in one direction, said yoke element adapted to contact with a non-axial portion of the wheel to lock it against rotation when the lever is moved to its opposite operative position, said lever arms projecting longitudinally of the wheel beyond its periphery, and yoke elements disposed beyond the periphery of the wheel rigidly securing the arms together.

5. In a caster, the combination with a caster wheel, a bifurcated caster yoke adapted to be secured to an article to be supported by the wheel, an axle for the wheel, a lever element having a pair of joined lever arms disposed at either side of the wheel, each of the arms being secured on a different end of the axle, each of the yoke forks being pivotally secured eccentrically of the axle to a different one of the said arms, said lever adapted to be rocked to two different operative positions, and stop means to limit the rocking movement of the lever in one direction, said yoke element adapted to contact with a non-axial portion of the wheel to lock it against rotation when the lever is moved to its opposite operative position, said lever arms projecting longitudinally of the wheel and beyond the periphery thereof in two opposite directions, and yoke elements disposed beyond the periphery of the wheel rigidly securing the lever arms together at both ends to form a wheel carriage.

6. In a caster construction, the combination with a caster wheel, a wheel carriage therefor comprising a pair of joined side plates disposed laterally of the wheel and extending longitudinally thereof, a wheel axle secured at each of its ends to a side plate of the wheel carriage, a caster yoke element having a pair of forks pivotally secured to the carriage side plates eccentrically of the axle and above the horizontal plane thereof, a pair of pedal portions for the carriage for rocking the same to shift the said pivotal connection eccentrically relative to the wheel to either of two alternative operative positions to dispose the same at either side of a vertical plane of the wheel axis, in one of which positions the wheel engages a non-rotatable portion of the caster to lock the wheel against rotation.

7. In a caster construction, the combination with a caster wheel, a wheel carriage therefor comprising a pair of joined side plates disposed laterally of the wheel and extending longitudinally thereof, a wheel axle secured at each of its ends to one of the side plates, a swivelling caster yoke comprising a pair of depending trailing forks, each of the forks making pivotal connection adjacent its end to one of the side plates, eccentrically of the wheel axle above the horizontal plane thereof and shiftable about the axis of the axle to either of two alternative operative positions at either side of the vertical plane relative to the wheel axis, in one of such positions the wheel is adapted to be brought into contact with a relatively stationary portion of the caster to lock the wheel against rotation, and in the other position being freely rotatable, in said last position, the pivotal connection between the fork and carriage being disposed sufficiently low as to prevent rocking displacement of the carriage from such position when the caster supporting a load is rolled on its wheel tread.

8. In a caster mechanism, the combination with a caster stem supporting bifurcated yoke, a caster wheel, an axle therefor, a wheel carriage interposed between the axle and the yoke and making pivotal connection at spaced points with the axle and the yoke, and pedally operated lever means for rocking the carriage relatively to the yoke to bring the wheel into locking engagement with a portion of the yoke.

9. In a caster mechanism, in combination with an element to support an article on the caster, a fork member secured to the element and swivelable thereon, a frame pivoted to the element and adapted to oscillate through an arc of movement transverse to the swivelling axis of the caster, a wheel revolubly carried by said frame upon which the caster is at all times supported, means to limit the oscillatory movement of the frame in one direction, said wheel wedging against an extraneous portion of the mechanism at its periphery, when the frame is moved in the other direction to limit its oscillatory movement in that direction and to prevent rotation of the wheel to provide a stationary structure.

10. In a caster mechanism, in combination with an element to support an article on the caster, a fork member secured to the element and swivelable thereon, a frame pivoted to the element and adapted to oscillate through an arc of movement transverse to the swivelling axis of the caster, a wheel revolubly carried by said frame upon which the caster is at all times supported, means to limit the oscillatory movement of the frame in one direction, and means to limit the oscillation of said wheel in the opposite direction and adapted to hold it in vertical alignment with the swivelling axis of said fork member.

11. In a caster mechanism, the combination with a caster yoke, said yoke comprising an article support in swivelling engagement with the other portions of the yoke, a caster wheel, an axle therefor, a wheel carriage interposed between the axle and yoke and making pivotal connection at spaced points with the axle and yoke, and lever means operable for rocking the carriage relative to the yoke to bring the wheel into locking engagement with a portion of the yoke, and with the axle disposed substantially vertically below the swivelling axis of the yoke.

12. A caster mechanism comprising a part adapted to support an article of furniture, a fork member swivelled upon said part, said member having spaced fork elements extending at an angle to the axis of said part, a frame pivotally carried by said fork elements, an axle secured to said frame, said part comprising means for securing said fork member therewith, and a wheel revolubly mounted upon said axle, the ends of said fork elements engaging the axle to limit the pivotal movement of said frame in one direction and said wheel wedging against said part to provide a stationary structure when said frame is moved in the other direction.

13. In a load supporting mechanism, the combination with a roller and a transverse axle therefor, of means supported by the axle, comprising a load carrying frame, a frame element interposed between said frame and axle and pivotally connected with the frame and axle at spaced points on the frame element, the point of connection of said frame element with said frame being eccentric of said axle, the frame element being provided with portions adapted to be alternately elevated and depressed by which the frame element may be alternately oscillated relatively around the pivot connection thereof with the frame, and stop means for limiting the amount of pivoting between the frame and the frame element in both directions, said stop means including a portion of the roller and a stop portion of said supported means engageable therewith.

14. In a wheeled supporting mechanism, the combination with a load supporting wheel axle, a wheel rotatable on the axle, a frame element interconnecting said load support and axle, said frame element being relatively pivotally joined to the axle and to the load support at two spaced points on the frame element, that for the load support being disposed in a plane above that for the axle and shiftable to either of two alternative positions upon opposite limited rotational movement of the frame element relative to the axle, each disposed in a plane on different sides of the vertical plane of the axle, the frame element being provided with portions adapted to be alternately elevated and depressed by which the frame element may be alternately oscillated relatively around the pivot connection thereof with the frame, and braking means operative upon movement to one only of said alternative positions adapted to restrain rotation of the wheel.

15. In a wheeled supporting mechanism, the combination with a load supporting wheel axle, a wheel rotatable on the axle, a frame element interconnecting said load support and axle, said frame element being relatively pivotally joined to the axle and to the load support at two spaced points on the frame element, that for the load support being disposed in a plane above that for the axle and shiftable to either of two alternative positions upon opposite limited rotational movement of the frame element relative to the axle, each disposed in a plane on different sides of the vertical plane of the axle, and braking means operative upon movement to one only of said alternative positions adapted to restrain rotation of the wheel, and a pedal adapted for engagement by the foot of an operator to effect limited rotational movement of the frame element on the axle in opposite directions.

16. In a load supporting mechanism, a supporting roller, a transverse rotational bearing for the roller, a frame element supported at the bearing and mounted to oscillate about the axis of the bearing, a load supporting element pivotally connected to the frame element at a point above the horizontal plane of the bearing axis the said pivotal connection being oscillatable with the frame element from one side to the other of a vertical plane through the bearing axis and the load supporting element being adapted to rest by gravity upon a portion of the roller at a point above the roller axis when said frame element has been oscillated in one direction.

17. In a load supporting mechanism, a supporting roller, a transverse rotational bearing for the roller, a frame element supported at the bearing and mounted to oscillate about the axis of the bearing, a load supporting element pivotally connected to the frame element at a point above the horizontal plane of the bearing axis the said pivotal connection being oscillatable with the frame element from one side to the other of a vertical plane through the bearing axis and the load supporting element being adapted to rest by gravity upon and transfer substantially its entire supported load to a portion of the roller when said frame element has been oscillated in one direction.

18. In a load supporting mechanism, a supporting roller, a transverse rotational bearing for the roller, a frame element supported at the bearing and mounted to oscillate about the axis of the bearing, a load supporting element pivotally connected to the frame element at a point above the horizontal plane of the bearing axis, the said pivotal connection being oscillatable with the frame element from one side to the other of a vertical plane through the bearing axis and the load supporting element being adapted to rest by gravity upon a portion of the roller at a point above the roller axis when said frame element has been oscillated in one direction, and a stop on the load supporting element to limit the oscillatory movement of the frame element in the other direction at a position in which the load supporting element clears the wheel.

19. In a load supporting mechanism, a supporting roller, a transverse rotational bearing for the roller, a frame element supported at the bearing and mounted to oscillate about the axis of the bearing, a load supporting element pivotally connected to the frame element at a point above the horizontal plane of the bearing axis the said pivotal connection being oscillatable with the frame element from one side to the other of a vertical plane through the bearing axis and the load supporting element being adapted to rest by gravity upon a portion of the roller at a point above the roller axis when said frame element has been oscillated in one direction, and the load supporting element being adapted to engage and brake rotational movement of the roller when said frame element has been oscillated in one direction, a stop on the load supporting element to limit the oscillatory movement of the frame element in the other direction at a position in which the load supporting element clears the wheel, and operable means for oscillating the frame element from one position to the other.

20. In a caster mechanism, a supporting roller, a transverse rotational bearing for the roller, a frame element supported at the bearing and mounted to oscillate about the axis of the bearing, a load supporting element pivotally connected to the frame element at a point above the horizontal plane of the bearing axis, said pivotal connection being oscillatable from one side to the other of a vertical plane through the wheel axis, the load supporting element being provided with means for engaging the load to be supported, and rotatable relative to the load on a vertical castering axis, a stop on the load supporting element to limit the oscillatory movement of the frame element in one direction at a position in which the load supporting element clears the wheel, and in which its castering axis lies at one side of the roller axis, and the load supporting element being adapted to engage and brake rotational movement of the roller when the frame element is oscillated in the other direction.

21. In a caster mechanism, a supporting roller, a transverse rotational bearing for the roller, a frame element supported at the bearing and mounted to oscillate about the axis of the bearing, a load supporting element pivotally connected to the frame element at a point above the horizontal plane of the bearing axis, said pivotal connection being oscillatable from one side to the other of a vertical plane through the wheel axis, the load supporting element being provided with means for engaging the load to be supported, and rotatable relative to the load on a vertical castering axis, a stop on the load supporting element to limit the oscillatory movement of the frame element in one direction at a position in which the load supporting element clears the wheel, and in which its castering axis lies at one side of the roller axis, and a stop on the load supporting element to limit the oscillatory movement of the frame element in the other direction at a position in which the castering axis lies adjacent to the roller axis, whereby castering of the device is prevented.

22. In a caster mechanism, a supporting roller, a transverse rotational bearing for the roller, a frame element supported at the bearing and mounted to oscillate about the axis of the bearing, a load supporting element pivotally connected to the frame element at a point above the horizontal plane of the bearing axis, said pivotal connection being oscillatable from one side to the other of a vertical plane through the wheel axis, the load supporting element being provided with means for engaging the load to be supported, and rotatable relative to the load on a vertical castering axis, a stop on the load supporting element to limit the oscillatory movement of the frame element in one direction at a position in which the load supporting element clears the wheel, and in which its castering axis lies at one side of the roller axis, and a stop on the load supporting element to limit the oscillatory movement of the frame element in the other direction by engagement of the stop with the roller whereby to brake rotational movement of the roller and to position the load supporting element with its castering axis adjacent the roller axis to prevent castering of the device.

23. In a caster mechanism, a supporting roller, a transverse rotational bearing for the roller, a frame element supported at the bearing and mounted to oscillate about the axis of the bearing, a load supporting element pivotally connected to the frame element at a point above the horizontal plane of the bearing axis, said pivotal connection being oscillatable from one side to the other of a vertical plane through the wheel axis, the load supporting element being provided with means for engaging the load to be supported, and rotatable relative to the load on a vertical castering axis, a stop on the load supporting element to limit the oscillatory movement of the frame element in one direction at a position in which the castering axis lies at one side of the roller axis to permit castering of the device, and a stop to limit oscillatory movement of the frame element in the other direction at a position in which the castering axis lies adjacent to the roller axis whereby castering is prevented.

24. In a caster mechanism, a supporting roller, a transverse rotational bearing for the roller, a frame element, a load supporting element associated with the frame element and roller, adapted to transfer load through the frame element to the roller, the load supporting element being provided with means for engaging the load to be supported and rotatable relative to the load on a vertical castering axis lying at one side of the roller axis, the load supporting element being adapted to be moved to a load supporting position in which the castering axis lies adjacent to the roller axis whereby castering is prevented.

25. In a load supporting mechanism adapted to roll upon a floor, a load supporting element adapted to be connected to the load to be supported, a roller adapted to support the load supporting element and roll upon the floor, a pedal operable mechanism comprising a fulcrum for successively elevating the load supporting element, rocking it over the fulcrum and depressing it, means whereby said movement of the load supporting element renders the roller inoperative for rolling on the floor, said pedal operating mechanism comprising a frame, a fulcrum upon which the frame may rock, a pivot connection for the frame on the load supporting element and a pair of pedal portions on the frame by which the frame may be oscillated in alternate directions.

26. In a load supporting mechanism adapted to roll upon a floor, a load supporting element adapted to be connected to the load to be supported, a roller adapted to support the load supporting element and roll upon the floor, a pedal operable mechanism comprising a fulcrum for successively elevating the load supporting element, rocking it over the fulcrum and depressing it, means whereby said movement of the load supporting element renders the roller inoperative for rolling on the floor, said pedal operating mechanism comprising a frame, a fulcrum upon which the frame may rock, a pivot connection for the frame on the load supporting element and a pedal portion on the frame by which it may be rocked.

In testimony whereof I hereunto affix my signature this 1st day of October, 1924.

MAYO E. ROE.